March 22, 1938.   E. M. CLAYTOR   2,112,067
FURNACE CONTROL SYSTEM
Filed April 14, 1934
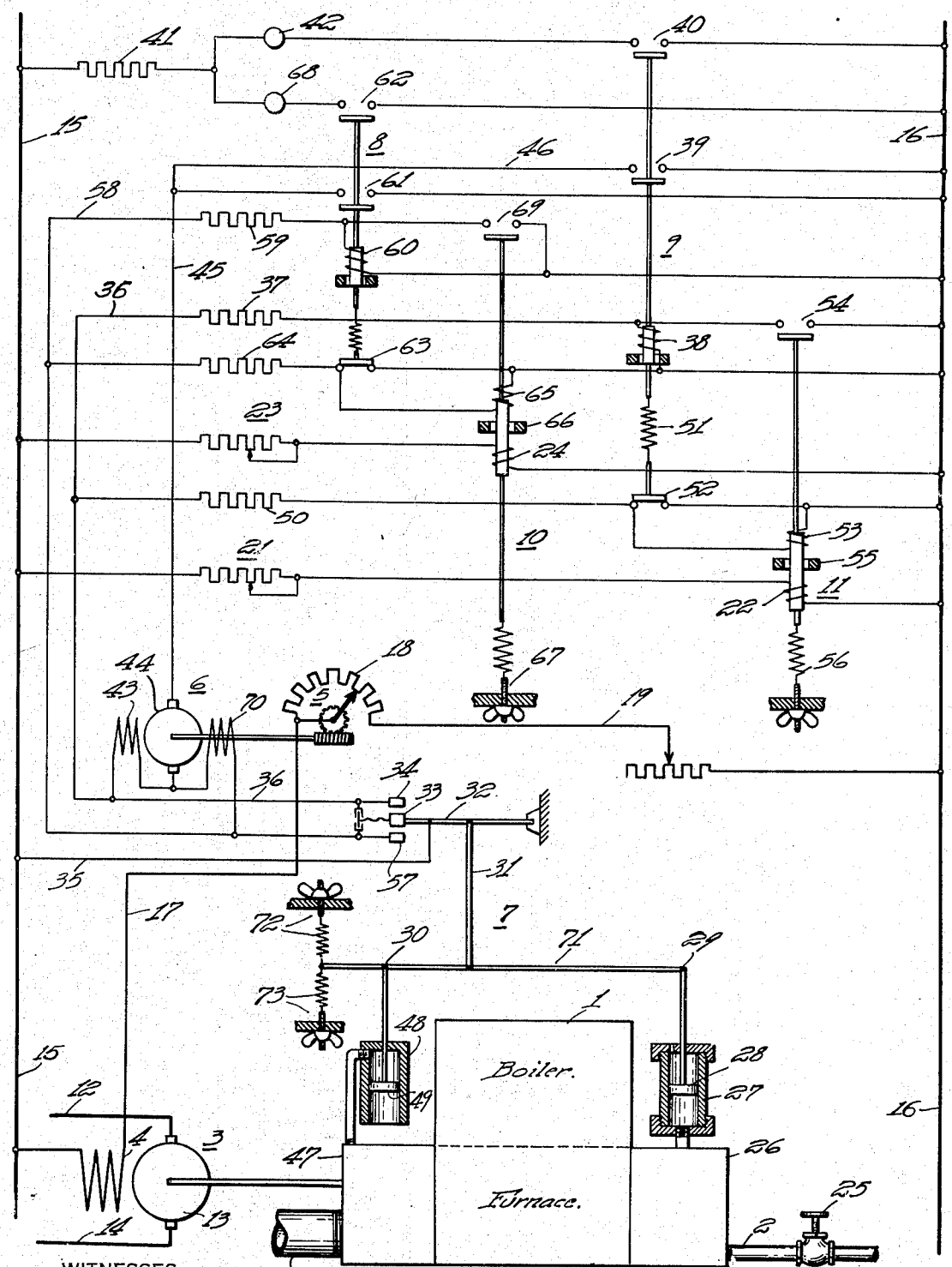
WITNESSES:
INVENTOR
Edward M. Claytor.
BY
ATTORNEY Patented Mar. 22, 1938

2,112,067

UNITED STATES PATENT OFFICE 2,112,067

FURNACE CONTROL SYSTEM

Edward M. Claytor, Wilkinsburg, Pa., assignor to Westinghouse Electric & Manufacturing Company, East Pittsburgh, Pa., a corporation of Pennsylvania Application April 14, 1934, Serial No. 720,668

2 Claims. (Cl. 158—1)

My invention relates to systems of control for furnaces and more particularly to a follow up system having anti-hunting features for controlling the operating characteristics of a motor or a plurality of motors controlling the operation of a furnace.

With the follow-up systems heretofore utilized, considerable difficulty is experienced because of the fact that these systems have the habit of oscillating or hunting when a speed change of the motor to be controlled is to be effected. If the induced draft for the furnace of a boiler is to be controlled and the fuel supply is changed or, if the battery of stoker motors are to be controlled in relation to the pressure in the flue, hunting causes an improper operation and often a wastage of fuel and a lowering of the efficiency of the plant.

One object of my invention is to provide, in a control for a furnace, a follow-up system wherein hunting is substantially eliminated.

Other objects and advantages of my invention will become apparent from a study of the following specification, when considered in conjunction with the accompanying drawing, wherein the single figure illustrates diagrammatically a system of control, namely a follow-up system, for controlling the speed of a motor operating a fan or blower for inducing a draft for a boiler furnace.

Referring more particularly to the figure, a boiler and furnace 1 is provided with a fuel supply pipe 2 which, in this instance, is an oil supply pipe, and a motor 3 for driving a draft fan disposed in the housing 47. The motor armature 13 may be energized from buses 12 and 14. The motor 3 is provided with a field winding 4, adapted to be connected to buses 15 and 16 and the excitation of which may be controlled by a motor-operated rheostat 5 operated by a split series motor 6. To control the direction of rotation of the motor 6, a system 7 of levers and pistons is provided, which levers may be actuated in response to the pressure, or the quantity, of the fuel being supplied to the furnace and the pressure of the draft induced by the motor 3.

In order that the motor 6 may not effect, at one operation, the complete correction that may be desired for any change in the quantity of fuel supplied to the furnace, a pair of line contactors 8 and 9 are provided, which contactors control a pair of inductive time-limit contactors 10 and 11. Line contactors 8 and 9 also preferably have an inductive time delay effect. These inductive time-limit contactors 10 and 11, in turn, control the line contactors 8 and 9 in a manner explained more clearly hereinafter.

If the steam pressure in the boiler is to be maintained at a given value, but because of the excessive demand, or for other reasons, the pressure drops and it is necessary to increase the fuel supplied, in such case it is also necessary to increase the draft to thereby maintain the efficiency of combustion at or near the desired value. If the fuel supplied from the pipe 2 is increased by appropriate manipulation of the throttle valve 25, the speed of the motor 3 must be increased a corresponding amount, and this result is accomplished by appropriate operation of the rheostat 5 by the motor 6. If, however, the motor 6 were called upon to effect the complete correction at one operation, it would invariably overshoot so that a reverse operation is necessary and hunting would take place. To eliminate this undesirable feature, the time-limit contactors 10 and 11 are provided to control the line contactors 8 and 9. This controlling action will be better understood from a study of a typical sequence of operation.

If the attendant actuates valve 25 to supply more fuel to the furnace, the pressure in adjacent chamber 26 rises and, in consequence, the pressure in cylinder 27 rises forcing the piston 28 upwardly against springs 72 and 73. The junction 29 of the floating lever 71, to which the rod of piston 28 is attached, is thus moved upwardly because, for the assumptions made, pivot point 30 of lever 71 with the rod of piston 49 in cylinder 48, remains stationary. The position of pivot point 30 may be adjusted by the spring assemblies 72 and 73, respectively, so that any desired induced draft pressure may be secured.

Counterclockwise rotation of the floating lever 71 about the pivot point 30 moves the pivotally associated link 31 upwardly, thereby moving the contact-carrying lever 32 in a clockwise direction, and contact members 33 and 34 are caused to engage. When the contact members 33 and 34 engage, a circuit is established from the bus 15 through conductor 35, contact members 33 and 34, conductor 36, resistor 37, and actuating coil 38 of the line contactor 9 to the bus 16.

Operation of the line contactor 9 immediately closes the contact members 39 and 40 and places spring 51 under tension. Since the contact members 52 have some inertia the spring 51 permits a short delay after the closing of the contact members 39 and 40 before contact members 52 open. Closing of the contact members 40 establishes a circuit from the bus 15 through resistor 41, signal 42, and contact members 40 to the bus 16. Signal 42 may be a light of a specific color or a bell or any other signal having special characteristics distinct from the characteristics of the signal 68. Signal 42 will indicate that line contactor 9 has operated and that the operation of the motor 6 is in such a direction as to increase the speed of motor 3, thereby effecting a faster feeding of the air to the furnace.

The circuit for the motor 6 may be traced from the energized conductor 35 through contact members 33 and 34, field winding 43 and armature 44 of motor 6, conductors 45 and 46, and contact member 39 to the bus 16.

The opening of the contact members 52 establishes a circuit from the energized conductor 35 through current-limiting resistor 50, and magnetizing coil 53 of the inductive time-limit contactor 11 to the bus 16. The time-limit contactor 11 is provided with a low resistance closed circuit 55, a neutralizing coil 22 and an adjustable spring assembly 56. The neutralizing coil 22 is connected directly across buses 15 and 16 through an adjustable current-limiting resistor 21. By appropriate adjustment of resistor 21 and spring assembly 56, the time constant of contactor 11 may be changed to any selected value within a certain range.

Energization of coil 53 closes the contact members 54, thereby establishing a shunt circuit for the actuating coil 38 to deenergize this coil. When coil 38 is deenergized, contact members 39 and 40 immediately open and contact members 52 close deenergizing the magnetizing coil 53. However, since the inductive time-limit contactor 11 has a definite predetermined inductive time constant, contact members 54 will remain closed for a predetermined interval of time, so that motor 6 will not be immediately reenergized. In fact, the adjustment is such for the line contactor 9 and the time-limit contactor 11, that a single operation of the motor 6 is not likely to effect a complete correction unless the change in fuel supply be very small. The result is that the rheostat 5 will be operated over a comparatively small range and the motor 6 will be deenergized by the opening of the contact member 39 for an interval of time determined by the time-limit contactor 11, whereupon it is again reenergized by reason of the fact that the contact members 54 open after the lapse of said predetermined interval of time.

When the motor 6 operates as heretofore explained, more resistor sections are inserted in the field circuit, which circuit may be traced from the bus 15 through the field 4, conductor 17, resistor sections 18 and conductor 19 to bus 16.

This intermittent operation of motor 6 permits the motor 3 to be stabilized in its operation after each operation of motor 6 before motor 6 again operates. Or, more specifically stated, motor 6 operates for a comparatively short interval of time and is then at rest for a predetermined interval of time, which predetermined interval of time is usually longer than the operating time of the motor 6. These alternate periods of operation and rest continue until the desired total speed change for motor 3 has been accomplished. Furthermore, after each change of rheostat 5, the motor 3 accelerates or decelerates, as the case may be, and by reason of the period of rest, motor 3 attains a stable operation before a second operation of motor 6. The speed of motor 3 is thus changed intermittently in small increments with the result that neither will the motor 6 over-correct nor will motor 3 temporarily overshoot.

With the rise in speed of the motor 3, the pressure in chamber 47 increases and in consequence the pressure in the upper portion of the cylinder 48 increases, thus forcing the piston 49 downwardly so that the pivot point 30, heretofore stationary, is moved downwardly. After repeated incremental changes in the resistance value in the circuit of the field 4 of the motor 3, the speed will in time have changed sufficiently and, in consequence, the pressure on the discharge side of the induced draft fan, on the side of flue 74, will have risen sufficiently to move the pivot point down by an amount proportional to the amount the pivot point 29 was previously moved upwardly, with the result that the arm 32 will take its neutral position, as shown in the figure.

When it is necessary to decrease the induced draft pressure, as would be the case when the fuel supply is decreased, pivot point 29 will move down and the contact members 33 and 57 will engage, thereby establishing a circuit from energized conductor 35 through contact members 33 and 57, conductor 58, resistor 59, and actuating coil 60 of the line contactor 8 to the bus 16. Operation of the line contactor 8 will close the contact members 61 and 62 and, after a short interval of time, open the contact members 63.

The closing of contact members 62 energizes the signal 68 to indicate that the admission of fuel to the furnace is to be slower. Closing of contact members 61 establishes a circuit for motor 6 from the energized conductor 35 through contact members 33 to 57, field winding 70, the armature 44 of the motor 6, conductor 45, and contact member 61 to the bus 16. When the contact members 63 are opened, the magnetizing coil 65 of the time-limit contactor 10 is energized which thereupon closes the contact member 69 to deenergize the line contactor 8.

The time-limit contactor 10 is similar to the time-limit contactor 11, also having a neutralizing coil 24 energized from the buses 15 and 16 through adjustable current-limiting resistor 23, a low resistance closed circuit 66 and an adjustable spring assembly 67. By suitable adjustment of resistor 23 and assembly 67 the time constant may be predetermined within a suitable range.

It will be noted that coil 65 is energized only a short interval of time after the operation of the line contactor 8, whereupon the contact members 69 are closed, thus providing, for a comparatively short interval of time, for the operation of motor 6. In fact, in some instances, motor 6 may not make even a single complete revolution but, nevertheless, effects a small change in the resistance value in the circuit of the field 4, thereby decreasing the speed of the motor 3 by a small amount.

As soon as the time-limit contactor 10 has dropped, opening the circuit at 69, line contactor 8 is again operated, if the correction is not sufficient, and this intermittent operation of the motor 6 continues until pivot point 30 has moved upwardly by an amount proportional to the previous downward movement of pivot point 29, whereupon stable operation is again established.

While my invention, as hereinbefore explained, is shown as associated with a boiler furnace and a fuel supply to be supplied to the furnace, it is to be understood that my invention may have general application. I am also aware that my invention is susceptible of different showings than specifically made in the drawing and explained hereinbefore. I desire, therefore, that my invention be limited only by the pertinent prior art and the scope of the claims appended hereto.

I claim as my invention:

1. In a system for controlling the operation of a furnace burning a fluid fuel and having an artificial draft, in combination, means for varying the pressure of the fuel being supplied to the furnace, means responsive to the variations in pressure of the fluid fuel being supplied to the furnace, means responsive to the draft on the furnace, means for controlling the draft on the furnace, differential means, responsive to the difference in operating effect of said last two named means, adapted to change the draft on the furnace to correspond to the change in pressure of the fuel being supplied thereto, means for intermittently affecting the operation of the means for controlling the draft on the furnace, time limit means for controlling the time interval of each of said intermittent operations of the means for controlling the draft whereby said differential means produces its effect in small steps taken at predetermined intervals of time.

2. In a system for controlling the operation of a furnace burning a fluid fuel and having an artificial draft, in combination, a motor having a field winding, a fan, for producing a draft in the furnace, driven by said motor, an adjustable resistor for controlling the speed of the motor and thus the pressure at the high pressure side of the fan, a second motor for adjusting the resistance value of said resistor, means for varying the pressure of the fluid fuel being supplied to the furnace, differential means responsive to the difference of the pressure produced by the means for varying the pressure of the fuel being supplied to the furnace and the pressure at the high pressure side of the fan for controlling the direction of rotation of the second motor, to decrease the effect on the differential means thereby effecting a change in draft to correspond to the changes in the pressure of the fuel being supplied to the furnace, and time limit means, coacting with said differential means, adapted to energize the second motor by small steps taking place after the lapse of successive substantially predetermined intervals of time.

EDWARD M. CLAYTOR.